US012614980B2

(12) United States Patent
Aoyagi

(10) Patent No.: US 12,614,980 B2
(45) Date of Patent: Apr. 28, 2026

(54) CHARGE PUMP CIRCUIT

(71) Applicant: TOYOTA JIDOSHA KABUSHIKI KAISHA, Toyota (JP)

(72) Inventor: Shinsuke Aoyagi, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 18/987,795

(22) Filed: Dec. 19, 2024

(65) Prior Publication Data

US 2025/0219533 A1     Jul. 3, 2025

(30) Foreign Application Priority Data

Dec. 27, 2023     (JP) ................................. 2023-221407

(51) Int. Cl.
*H02M 3/07*             (2006.01)
(52) U.S. Cl.
CPC .................................... *H02M 3/07* (2013.01)
(58) Field of Classification Search
CPC ....................................................... H02M 3/07
USPC .......................................................... 327/536
See application file for complete search history.

(56) References Cited

U.S. PATENT DOCUMENTS

2024/0283259 A1* 8/2024 Aoyagi ................... B60L 58/21

FOREIGN PATENT DOCUMENTS

| JP | 2000-350439 A | 12/2000 |
| JP | 2018-182819 A | 11/2018 |

OTHER PUBLICATIONS

Uno, M., et al., "Analysis and Theoretical Comparison of 1-to-1.5 Resonant Switched Capacitor Converters for High-Voltage EV Batteries," Proc., 2022 International Power Electronics Conference (IPEC—Himeji 2022—ECCE Asia), 2022, pp. 2312-2319, DOI: 10.23919/IPEC-Himeji2022-ECCE53331.2022.9807057, URL: https://ieeexplore.ieee.org/document/9807057.

* cited by examiner

*Primary Examiner* — Tomi Skibinski
(74) *Attorney, Agent, or Firm* — Dinsmore & Shohl LLP

(57)                    ABSTRACT

A charge pump circuit includes: a charging stand; a battery connected in series with the charging stand; a first capacitor connected in parallel with the charging stand; a reactor and a second capacitor connected in series and connected in parallel with the charging stand; first, second, fifth, and sixth FETs connected to the charging stand; third and fourth FETs connected in series and connected in parallel with the charging stand; third and fourth capacitors connected in series and connected in parallel with the charging stand; and a control unit. Further, the control unit performs a boosting ratio 1.5 times mode by performing a boosting ratio 1 time mode and a boosting ratio 2 times mode in a predetermined order.

14 Claims, 12 Drawing Sheets

CHARGE PUMP CIRCUIT

CROSS-REFERENCE TO RELATED APPLICATION(S)

The present application claims priority to and incorporates by reference the entire contents of Japanese Patent Application No. 2023-221407 filed in Japan on Dec. 27, 2023.

BACKGROUND OF THE INVENTION

The present disclosure relates to a charge pump circuit.

Japanese Laid-open Patent Publication No. 2000-350439 discloses a boosting circuit capable of changing each boosting cell group to a series, parallel, or series-parallel connection configuration by providing a switching unit in a plurality of boosting cell groups that boosts and outputs an input voltage.

SUMMARY

There is a need for providing a charge pump circuit capable of continuously changing a boosting ratio with low loss.

According to an embodiment, a charge pump circuit includes: a charging stand; a battery connected in series with the charging stand; a first capacitor connected in parallel with the charging stand; a reactor and a second capacitor connected in series with each other and connected in parallel with the charging stand; a first FET, a second FET, a fifth FET, and a sixth FET connected to the charging stand; a third FET and a fourth FET connected in series with each other and connected in parallel with the charging stand; a third capacitor and a fourth capacitor connected in series with each other and connected in parallel with the charging stand; and a control unit. Further, the control unit performs a boosting ratio 1.5 times mode by performing a boosting ratio 1 time mode and a boosting ratio 2 times mode in a predetermined order; and performs arbitrary boosting between boosting ratios of 1 to 2 times by performing the boosting ratio 1.5 times mode and the boosting ratio 1 time mode in a predetermined order, or performing the boosting ratio 1.5 times mode and the boosting ratio 2 times mode in a predetermined order.

DETAILED DESCRIPTION

In the technology disclosed in Japanese Laid-open Patent Publication No. 2000-350439, for example, it is not possible to realize boosting with a boosting ratio less than two times such as a boosting ratio of 1.5 times, and it is also not possible to perform step-down in the reverse direction. In addition, for example, there is a technique of selecting a plurality of boosting ratios, but it is difficult to continuously change (vary) the boosting ratio.

A charge pump circuit according to an embodiment of the present disclosure will be described with reference to the drawings. Note that the constituent elements in the following embodiment include those that can be easily replaced by those skilled in the art or those that are substantially the same.

Circuit Configuration

A configuration of a charge pump circuit according to an embodiment will be described with reference to FIGS. 1, 2, 3, and 5. The charge pump circuit according to the embodiment is a charge pump type boosting/step-down circuit. The charge pump circuit according to the embodiment is applied to, for example, a high-power DC-DC converter mounted on a battery electric vehicle (BEV)) or a fuel cell vehicle (FCV).

Figure 1:
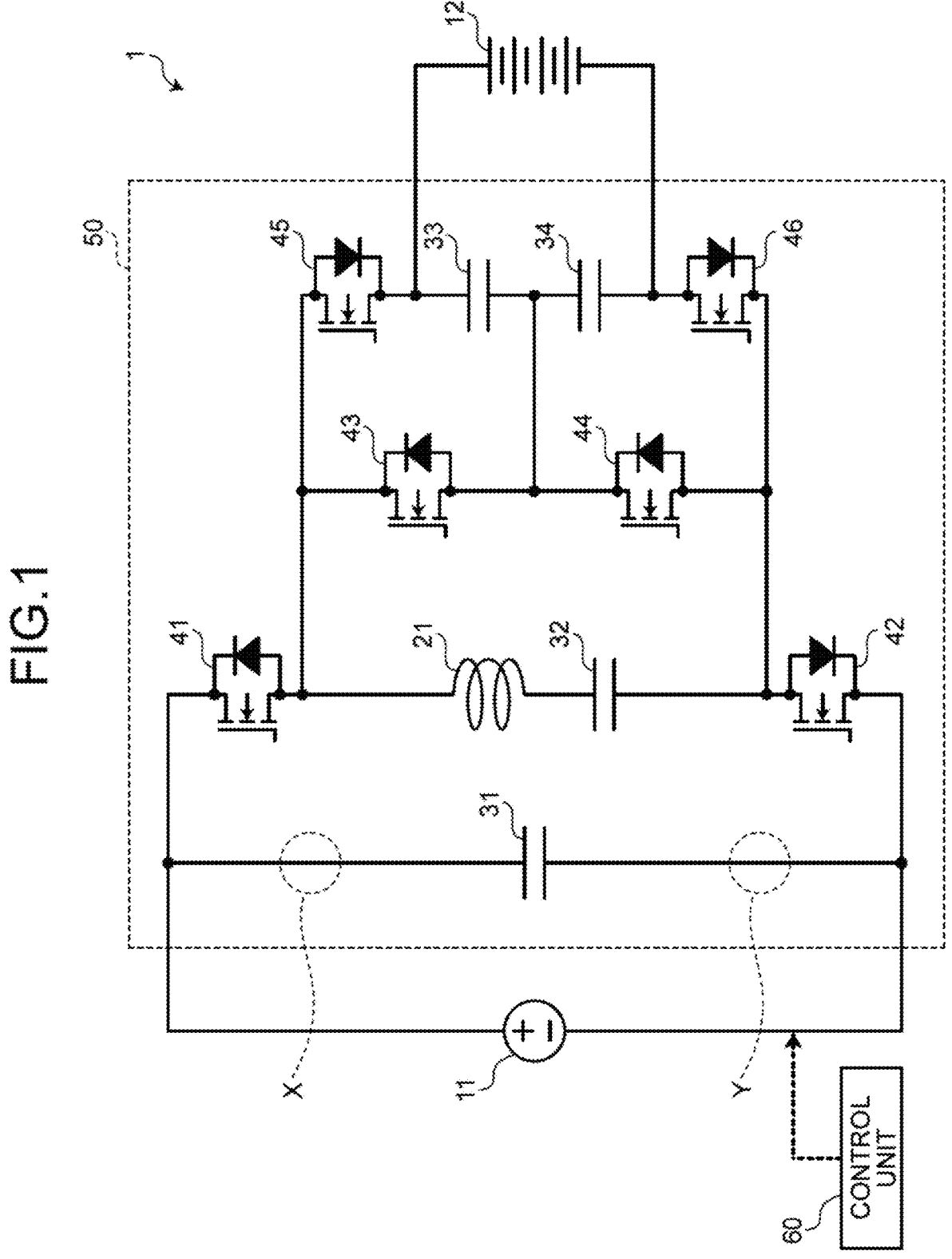
FIG. 1 is a diagram illustrating an example of a circuit configuration of a charge pump circuit according to an embodiment.

As illustrated in FIG. 1, a charge pump circuit 1 includes a charging stand 11, a battery 12, a reactor 21, a first capacitor 31, a second capacitor 32, a third capacitor 33, and a fourth capacitor 34. The charge pump circuit 1 further includes a first FET 41, a second FET 42, a third FET 43, a fourth FET 44, a fifth FET 45, a sixth FET 46, and a control unit 60. Note that a configuration of the charge pump circuit 1 excluding the charging stand 11 and the battery 12 corresponds to a charging unit 50 of a vehicle.

The charging stand 11 is provided, for example, in a charging station or the like, and outputs a predetermined voltage (for example, 400 V). The charging stand 11 is connected in series with the first FET 41, the second FET 42, the fifth FET 45, the sixth FET 46, and the battery 12. The charging stand 11, the first capacitor 31, the reactor 21 and the second capacitor 32, the third FET 43 and the fourth FET 44, and the third capacitor 33 and the fourth capacitor 34 are connected in parallel.

The battery 12 corresponds to a battery of the vehicle, and outputs a predetermined voltage (for example, 400 V). The battery 12 is connected in series with the charging stand 11. The battery 12 is connected in series with the charging stand 11, the first FET 41, the second FET 42, the fifth FET 45, and the sixth FET 46. The battery 12, the first capacitor 31, the reactor 21 and the second capacitor 32, the third FET 43 and the fourth FET 44, and the third capacitor 33 and the fourth capacitor 34 are connected in parallel.

The reactor 21 is a reactor for resonance. The second capacitor 32 is a capacitor for resonance. Therefore, the reactor 21 and the second capacitor 32 constitute an LC resonator. The reactor 21 and the second capacitor 32 are connected in series with each other. The reactor 21 and the second capacitor 32 are connected in parallel with the charging stand 11 and the battery 12.

The first capacitor 31, the third capacitor 33, and the fourth capacitor 34 are voltage smoothing capacitors. The first capacitor 31 is connected in parallel with the charging stand 11 and the battery 12. The third capacitor 33 and the fourth capacitor 34 are connected in series with each other, and are connected in parallel with the charging stand 11 and the battery 12.

Each of the first FET 41, the second FET 42, the third FET 43, the fourth FET 44, the fifth FET 45, and the sixth FET 46 is an insulated gate field effect transistor (MOSFET: Metal-Oxide-Semiconductor Field Effect Transistor). This MOSFET is a semiconductor element having functions of a switch and a diode. In the following description, the first FET 41, the second FET 42, the third FET 43, the fourth FET 44, the fifth FET 45, and the sixth FET 46 may be simply referred to as "switching elements".

The first FET 41 is connected in series in the reverse direction with respect to the charging stand 11. That is, the first FET 41 allows a current from the charging stand 11 to flow in a switching-on state, and blocks the current from the charging stand 11 in a switching-off state. Note that "in the reverse direction with respect to the charging stand 11" specifically indicates that the diode of the MOSFET faces the direction of the charging stand 11.

In the charge pump circuit 1, the first FET 41 is connected in series with the charging stand 11, but may be connected in parallel with the charging stand 11. For example, the first FET 41 can be disposed at the position X in FIG. 1 with the diode facing downward. However, by connecting the first FET 41 in series in the reverse direction with respect to the charging stand 11 as in the charge pump circuit 1, for example, when an abnormal current flows from the charging stand 11 side, this current can be blocked by the first FET 41. That is, the first FET 41 in the charge pump circuit 1 functions as a current blocking mechanism.

The second FET 42 is connected in series in the forward direction with respect to the charging stand 11. Note that "in the forward direction with respect to the charging stand 11" specifically indicates that the diode of the MOSFET faces the reverse direction of the charging stand 11 side.

In the charge pump circuit 1, the second FET 42 is connected in series with the charging stand 11, but may be connected in parallel with the charging stand 11. For example, the second FET 42 can be disposed at the position Y in FIG. 1 with the diode facing upward.

The third FET 43 and the fourth FET 44 are connected in series with each other, and are connected in parallel with the charging stand 11 and the battery 12. The third FET 43 and the fourth FET 44 are connected in the reverse direction with respect to the charging stand 11. A midpoint of the third FET 43 and the fourth FET 44 is connected to a midpoint of the third capacitor 33 and the fourth capacitor 34.

The fifth FET 45 and the sixth FET 46 are connected in series in the forward direction with respect to the charging stand 11. The fifth FET 45, the sixth FET 46, the third capacitor 33, and the fourth capacitor 34 are connected in series with each other.

In the charge pump circuit 1, as described later, a plurality of current paths are formed when a boosting operation (or a step-down operation) is performed. In the present embodiment, these current paths are defined as a mode Z, a mode A, a mode B, a mode C, and a mode D for convenience.

Figure 2:
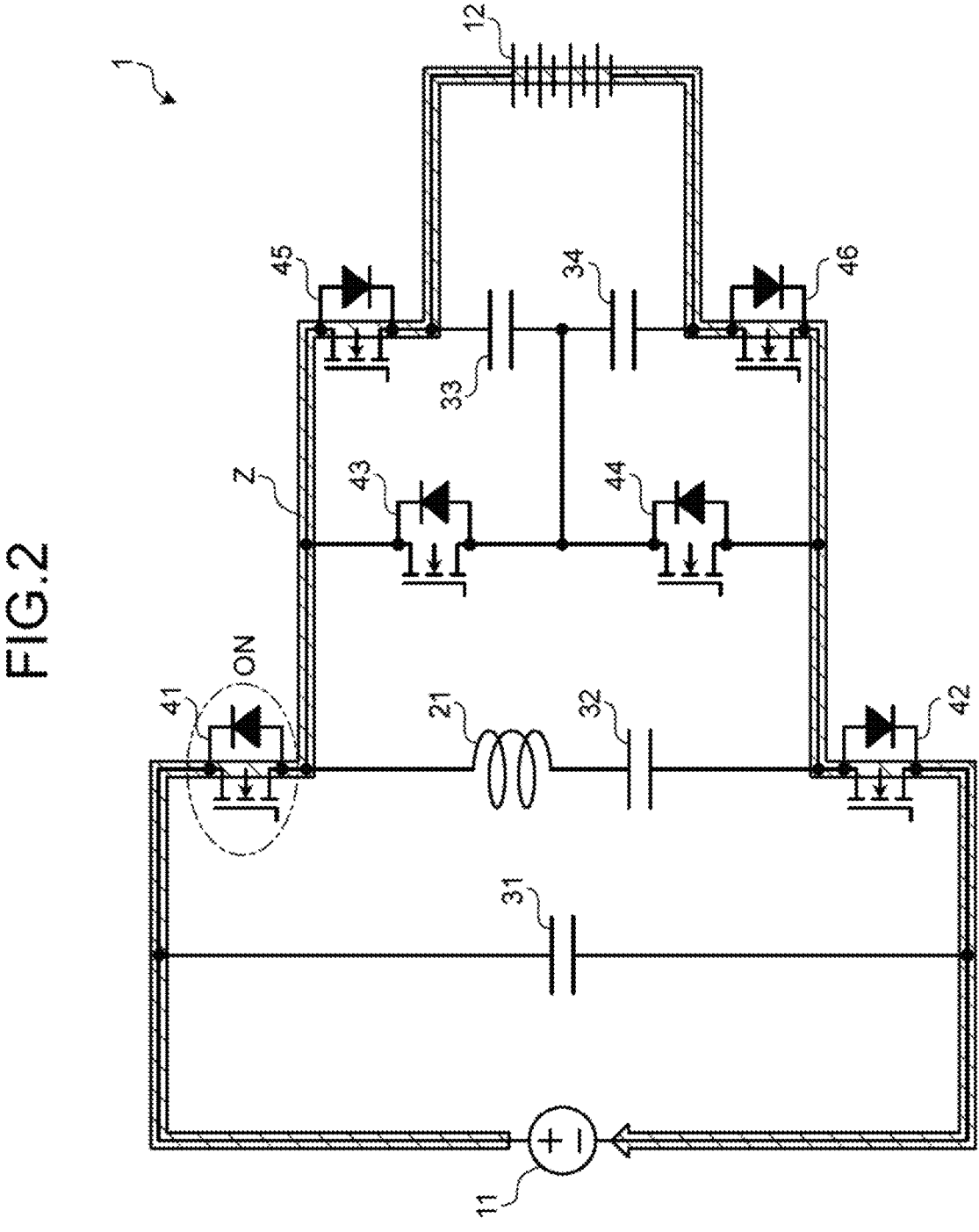
FIG. 2 is a diagram for explaining a first implementation method of a boosting ratio of 1 time in the charge pump circuit according to the embodiment.

In the mode Z, for example, as illustrated in FIG. 2, a current from the charging stand 11 flows through the first FET 41, the fifth FET 45, the battery 12, the sixth FET 46, and the second FET 42. The mode A is, for example, a path through which a current from the first capacitor 31 flows through the first FET 41, the reactor 21, the second capacitor 32, and the second FET 42 as illustrated in the upper left of FIG. 3. The mode B is, for example, a path through which a current from the second capacitor 32 flows through the third FET 43, the fourth capacitor 34, and the sixth FET 46 as illustrated in the upper right of FIG. 5.

Figure 5:
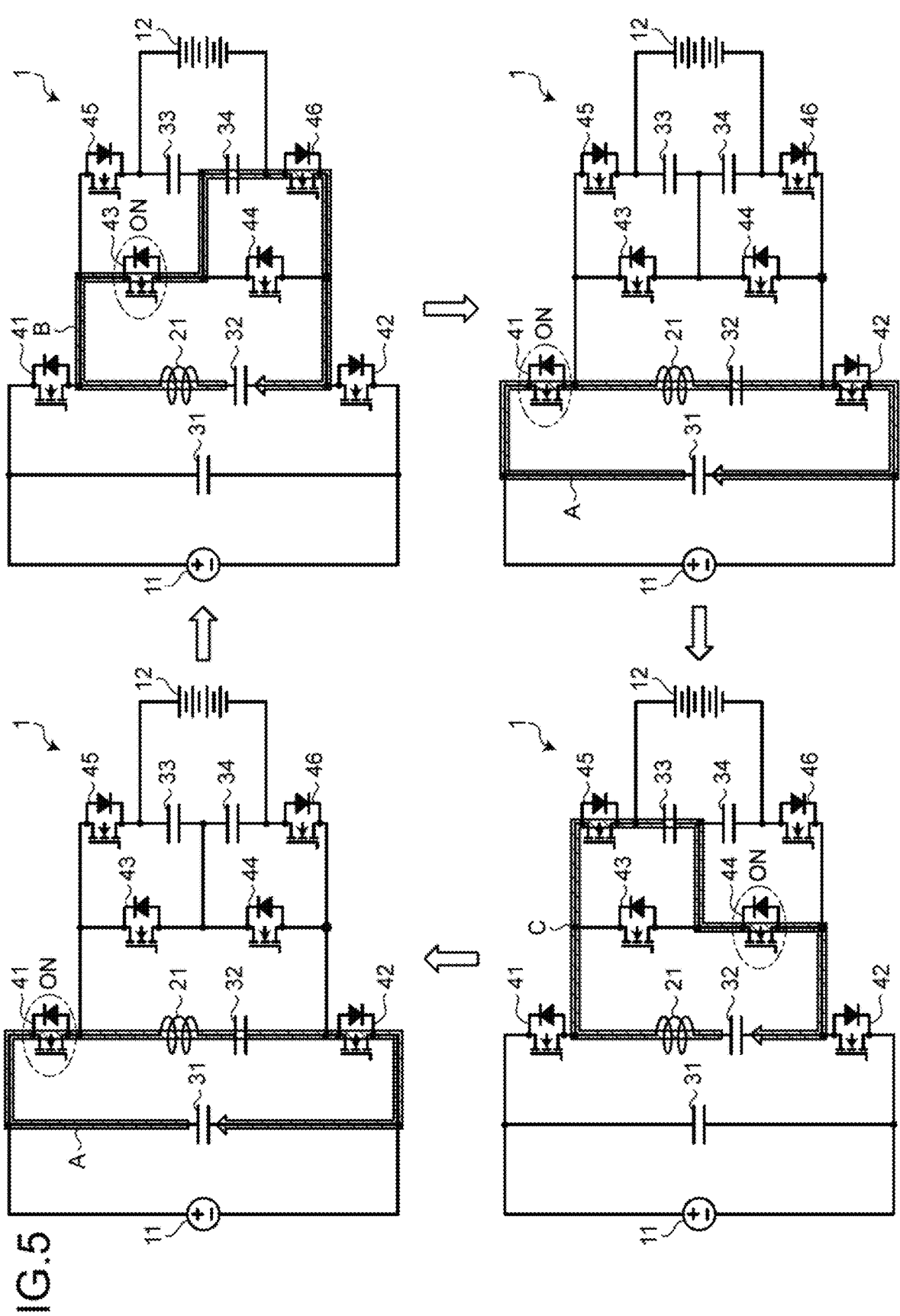
FIG. 5 is a diagram for explaining an implementation method of a boosting ratio of 2 times in the charge pump circuit according to the embodiment.

The mode C is, for example, a path through which a current from the second capacitor 32 flows through the fifth FET 45, the third capacitor 33, and the fourth FET 44 as illustrated in the lower left of FIG. 5. The mode D is, for example, a path through which a current from the second capacitor 32 flows through the reactor 21, the fifth FET 45, the third capacitor 33, the fourth capacitor 34, and the sixth FET 46 as illustrated in the upper right of FIG. 3. The arrangement of each element in the charge pump circuit 1 is not limited to the arrangement of FIG. 1 as long as the current path of each mode described above can be maintained (each mode can be separated), that is, the types of elements through which current flows are the same, and may be changed as necessary.

The control unit 60 controls each element of the charge pump circuit 1. The control unit 60 is an electronic control unit (ECU) mainly including a microcomputer including, for example, a central processing unit (CPU), a read only memory (ROM), a random access memory (RAM), and the like.

The control unit 60 performs the boosting ratio 1.5 times mode by performing the boosting ratio 1 time mode and the boosting ratio 2 times mode in a predetermined order. Then, the control unit 60 performs arbitrary boosting between the boosting ratios of 1 to 2 times by performing the boosting ratio 1.5 times mode and the boosting ratio 1 time mode in a predetermined order or performing the boosting ratio 1.5 times mode and the boosting ratio 2 times mode in a predetermined order.

Specifically, the control unit 60 performs arbitrary boosting between the boosting ratios of 1 to 1.5 times by performing the boosting ratio 1.5 times mode and the boosting ratio 1 time mode in a predetermined order. Specifically, the control unit 60 performs arbitrary boosting between the boosting ratios of 1.5 to 2 times by performing the boosting ratio 1.5 times mode and the boosting ratio 2 times mode in a predetermined order. Hereinafter, an implementation method of modes of the respective boosting ratios will be described.

First Implementation Method of Boosting Ratio of 1 Time

A first implementation method of a boosting ratio of 1 time (first boosting ratio 1 time mode) using the charge pump circuit according to the embodiment will be described with reference to FIG. 2. As illustrated in FIG. 2, the control unit 60 turns on the first FET 41, and allows a direct current (DC current) from the charging stand 11 to flow to the first FET 41, the fifth FET 45, the battery 12, the sixth FET 46, and the second FET 42, so that the first boosting ratio 1 time mode can be implemented. In the present embodiment, the current path in the first boosting ratio 1 time mode is defined as a "mode Z".

In the first boosting ratio 1 time mode, a current flows without performing switching in a state where the first FET 41 is turned on. For example, it is assumed that the voltage (battery voltage) of the battery 12 is 400 V and a current of, for example, 400 A is requested from the vehicle side. In this case, a current of 400 A is caused to flow from the charging stand 11 at 405 V obtained by adding a voltage (for example, 5 V) for pushing in the current. As a result, a current of 400 A is pushed in by a voltage difference of 5 V and supplied to the battery 12. In the first boosting ratio 1 time mode, since the switching of the switching element is not performed, boosting can be efficiently performed.

Second Implementation Method of Boosting Ratio of 1 Time

Figure 3:
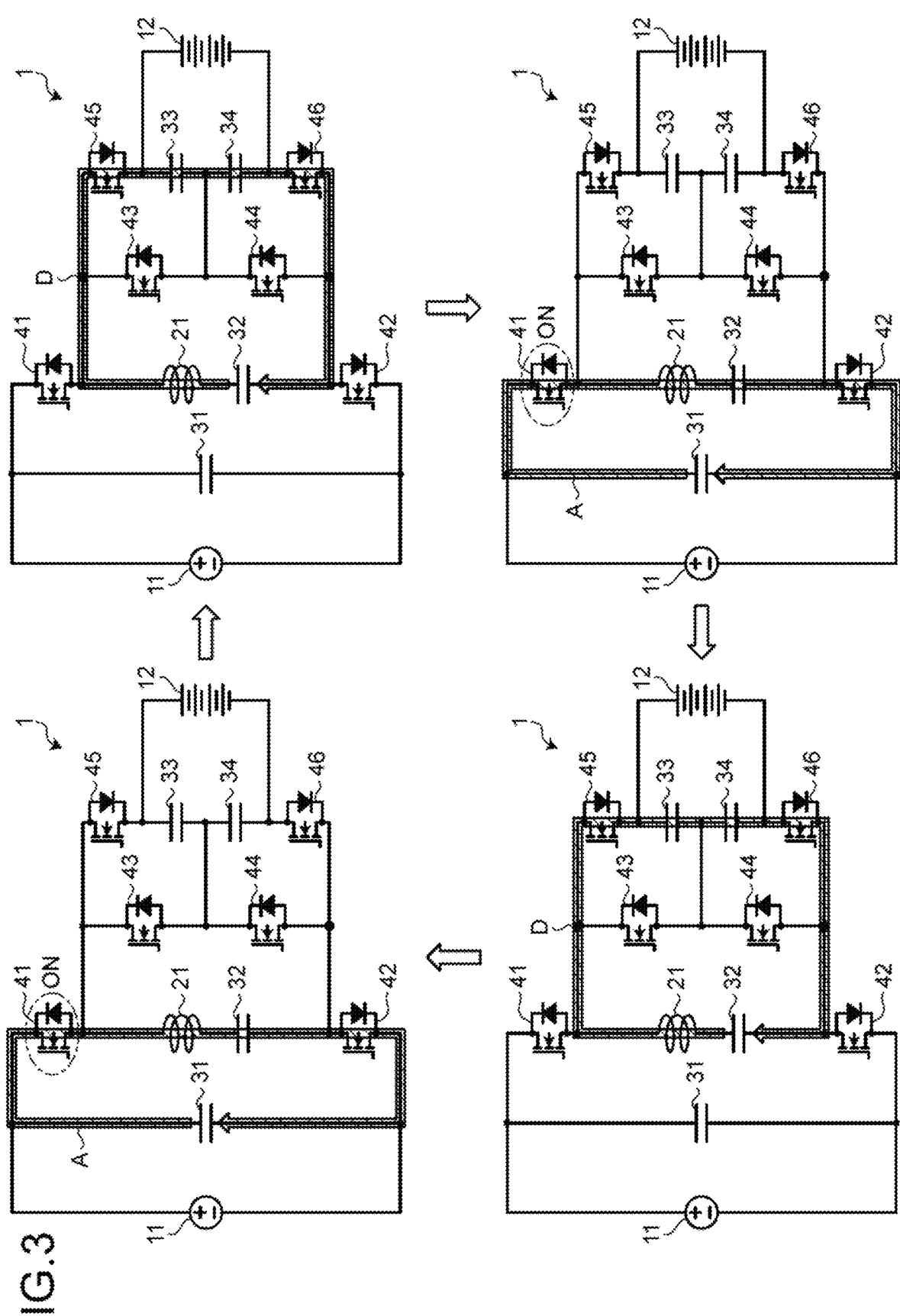
FIG. 3 is a diagram for explaining a second implementation method of a boosting ratio of 1 time in the charge pump circuit according to the embodiment.

A second implementation method of boosting ratio of 1 time (second boosting ratio 1 time mode) using the charge pump circuit according to the embodiment will be described with reference to FIGS. 3 and 4. For example, as illustrated in FIG. 3, the control unit 60 performs the second boosting ratio 1 time mode by performing the modes A and D in a predetermined order. Here, the mode A and the mode D are alternately performed in the order of the mode A, the mode D, the mode A, the mode D . . . . Hereinafter, details of each mode will be described clockwise from the mode A in the upper left of FIG. 3.

(1) In the mode A, the first FET 41 of each switching element is turned on, and the charge charged from the charging stand 11 to the first capacitor 31 is transferred to the second capacitor 32. For example, when the voltage (stand voltage) of the charging stand 11 is 400 V, the charging stand 11 and the first capacitor 31 are always connected, and therefore the first capacitor 31 is also charged at 400 V. Then, by turning on the first FET 41 from this state, the current path of the mode A is energized, and the charge moves from the first capacitor 31 to the second capacitor 32.

(2) In the mode D, the first FET 41 is turned off, and the charge charged to the second capacitor 32 is transferred to the third capacitor 33 and the fourth capacitor 34. In this mode D, by turning off the first FET 41 that has been turned on in the previous mode A, the current path in the mode D is energized, and the charge moves from the second capacitor 32 to the third capacitor 33 and the fourth capacitor 34.

(3) In the mode A, the first FET 41 of each switching element is turned on, and the charge charged from the charging stand 11 to the first capacitor 31 is transferred to the second capacitor 32.

(4) In the mode D, the first FET 41 is turned off, and charge charged to the second capacitor 32 is transferred to the third capacitor 33 and the fourth capacitor 34.

As described above, in the second boosting ratio 1 time mode, the switching by the first FET 41 is performed, and the boosting ratio of 1 time is implemented while the operation of the charge pump is performed. That is, in the second boosting ratio 1 time mode, for example, the third capacitor 33 and the fourth capacitor 34 are charged at a total of 400 V by bucket relaying the current of 400 V supplied from the charging stand 11. Since the third capacitor 33 and the fourth capacitor 34 are always connected to the battery 12, the battery 12 is also charged at 400 V.

Figure 4:
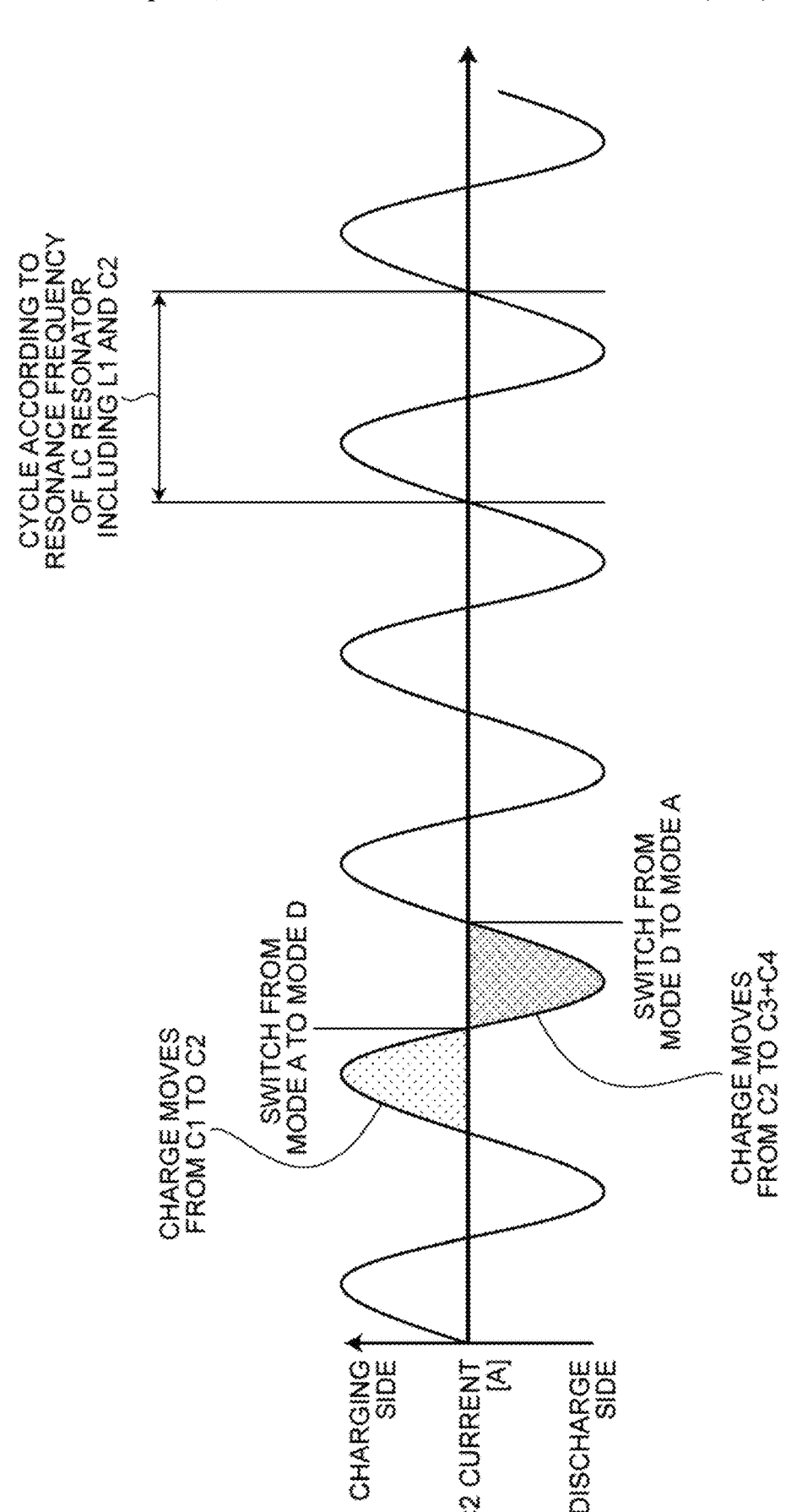
FIG. 4 is a diagram for explaining a mode switching timing in the second implementation method of a boosting ratio of 1 time in the charge pump circuit according to the embodiment.

Here, the LC resonator including the reactor 21 and the second capacitor 32 oscillates a sine wave as illustrated in FIG. 4, for example. In FIG. 4, L1 denotes the reactor, C1 denotes the first capacitor 31, C2 denotes the second capacitor 32, C3 denotes the third capacitor 33, and C4 denotes the fourth capacitor 34.

Therefore, as illustrated in FIG. 4, the control unit 60 switches each mode when the current (C2 current) of the second capacitor 32 is 0 in the cycle according to the resonance frequency of the LC resonator including the reactor 21 and the second capacitor 32.

That is, the control unit 60 switches from the mode A to the mode D at the moment when the charge moves from the first capacitor 31 (C1) to the second capacitor 32 (C2) on the upper side (positive half wave) of the sine wave and the power of the second capacitor 32 (C2) becomes 0. Subsequently, the control unit 60 switches from the mode D to the mode A at the moment when the charge moves from the second capacitor 32 (C2) to the third capacitor 33 (C3) and the fourth capacitor 34 (C4) on the lower side (negative half wave) of the sine wave and the power of the second capacitor 32 (C2) becomes 0.

As described above, by performing the soft switching (0 current/0 volt switch) by the first FET 41 at the timing when the power of the second capacitor 32 (C2) becomes 0, it is possible to perform boosting while suppressing the switching loss to the minimum.

Implementation Method of Boosting Ratio of 2 Times

An implementation method of boosting ratio of 2 times (boosting ratio 2 times mode) using the charge pump circuit according to the embodiment will be described with reference to FIGS. 5 and 6. For example, as illustrated in FIG. 5, the control unit 60 performs the boosting ratio 2 times mode by performing the modes A, B, A, and C in a predetermined order. Here, the mode A, the mode B, the mode A, and the mode C . . . are performed in this order. Hereinafter, details of each mode will be described clockwise from the mode A in the upper left of FIG. 5.

(1) In the mode A, the first FET 41 of each switching element is turned on, and the charge charged from the charging stand 11 to the first capacitor 31 is transferred to the second capacitor 32. For example, when the voltage (stand voltage) of the charging stand 11 is 400 V, the charging stand 11 and the first capacitor 31 are always connected, and therefore the first capacitor 31 is also charged at 400 V. Then, by turning on the first FET 41 from this state, the current path of the mode A is energized, and the charge moves from the first capacitor 31 to the second capacitor 32.

(2) In the mode B, the first FET 41 is turned off and the third FET 43 is turned on, and the charge charged to the second capacitor 32 is transferred to the fourth capacitor 34. In this mode B, the first FET 41 turned on in the previous mode A is turned off, and further the third FET 43 is turned on, so that the current path of the mode B is energized, and the charge moves from the second capacitor 32 to the fourth capacitor 34. Thus, for example, by bucket-relaying the current of 400 V supplied from the charging stand 11, the fourth capacitor 34 is charged at 400 V.

(3) In the mode A, the first FET 41 is turned on and the third FET 43 is turned off, and the charge charged from the charging stand 11 to the first capacitor 31 is transferred to the second capacitor 32.

(4) In the mode C, the first FET 41 is turned off and the fourth FET 44 is turned on, and the charge charged to the second capacitor 32 is transferred to the third capacitor 33. In this mode C, the first FET 41 turned on in the previous mode A is turned off, and further the fourth FET 44 is turned on, so that the current path of the mode C is energized, and the charge moves from the second capacitor 32 to the third capacitor 33.

As described above, in the boosting ratio 2 times mode, the switching by the first FET 41, the third FET 43, and the fourth FET 44 is performed, and the boosting ratio of 2 times is implemented while the operation of the charge pump is performed. That is, in the boosting ratio 2 times mode, for example, by bucket-relaying a current of 400 V supplied from the charging stand 11, the third capacitor 33 and the fourth capacitor 34 are charged at 400 V (total 800 V). Since the third capacitor 33 and the fourth capacitor 34 are always connected to the battery 12, the battery 12 is also charged at 800 V.

Figure 6:
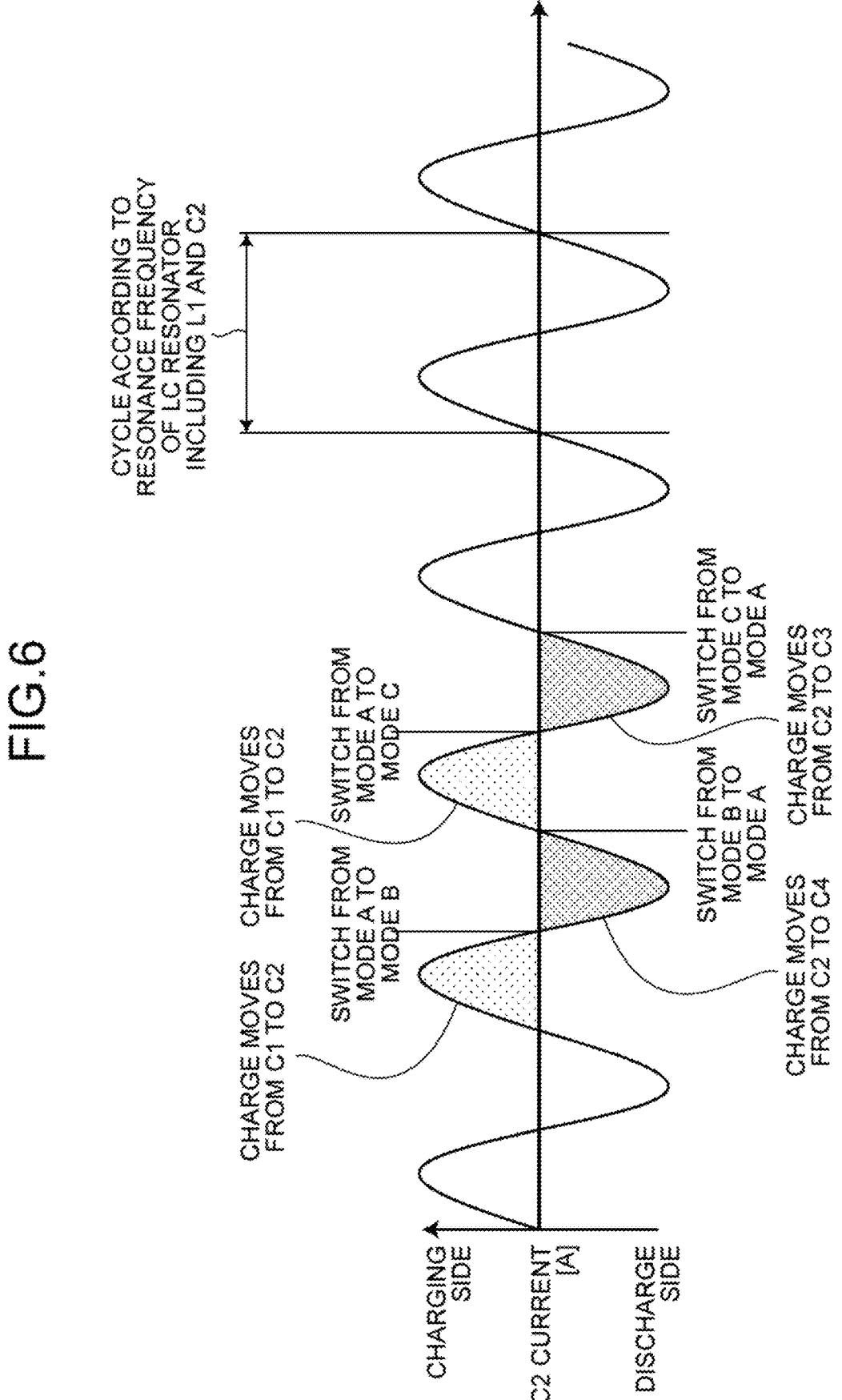
FIG. 6 is a diagram for explaining a mode switching timing in an implementation method of a boosting ratio of 2 times in the charge pump circuit according to the embodiment.

Here, the LC resonator including the reactor 21 and the second capacitor 32 oscillates a sine wave as illustrated in FIG. 6, for example. In FIG. 6, L1 denotes the reactor 21, C1 denotes the first capacitor 31, C2 denotes the second capacitor 32, C3 denotes the third capacitor 33, and C4 denotes the fourth capacitor 34.

Therefore, as illustrated in FIG. 6, the control unit 60 switches each mode when the current (C2 current) of the second capacitor 32 is 0 in the cycle according to the resonance frequency of the LC resonator including the reactor 21 and the second capacitor 32.

That is, the control unit 60 switches from the mode A to the mode B at the moment when the charge moves from the first capacitor 31 (C1) to the second capacitor 32 (C2) on the upper side (positive half wave) of the sine wave and the power of the second capacitor 32 (C2) becomes 0. Subsequently, the control unit 60 switches from the mode B to the mode A at the moment when the charge moves from the second capacitor 32 (C2) to the fourth capacitor 34 (C4) on the lower side (negative half wave) of the sine wave and the power of the second capacitor 32 (C2) becomes 0. Subsequently, the control unit 60 switches from the mode A to the mode C at the moment when the charge moves from the first capacitor 31 (C1) to the second capacitor 32 (C2) on the upper side (positive half wave) of the sine wave and the power of the second capacitor 32 (C2) becomes 0. Subsequently, the control unit 60 switches from the mode C to the mode A at the moment when the charge moves from the second capacitor 32 (C2) to the third capacitor 33 (C3) on the lower side (negative half wave) of the sine wave and the power of the second capacitor 32 (C2) becomes 0.

As described above, by performing the soft switching (0 current/0 volt switch) by the first FET 41, the third FET 43, and the fourth FET 44 at the timing when the power of the second capacitor 32 (C2) becomes 0, it is possible to perform the boosting while suppressing the switching loss to the minimum.

Implementation Method of Boosting Ratio of 1.5 Times

Figure 7:
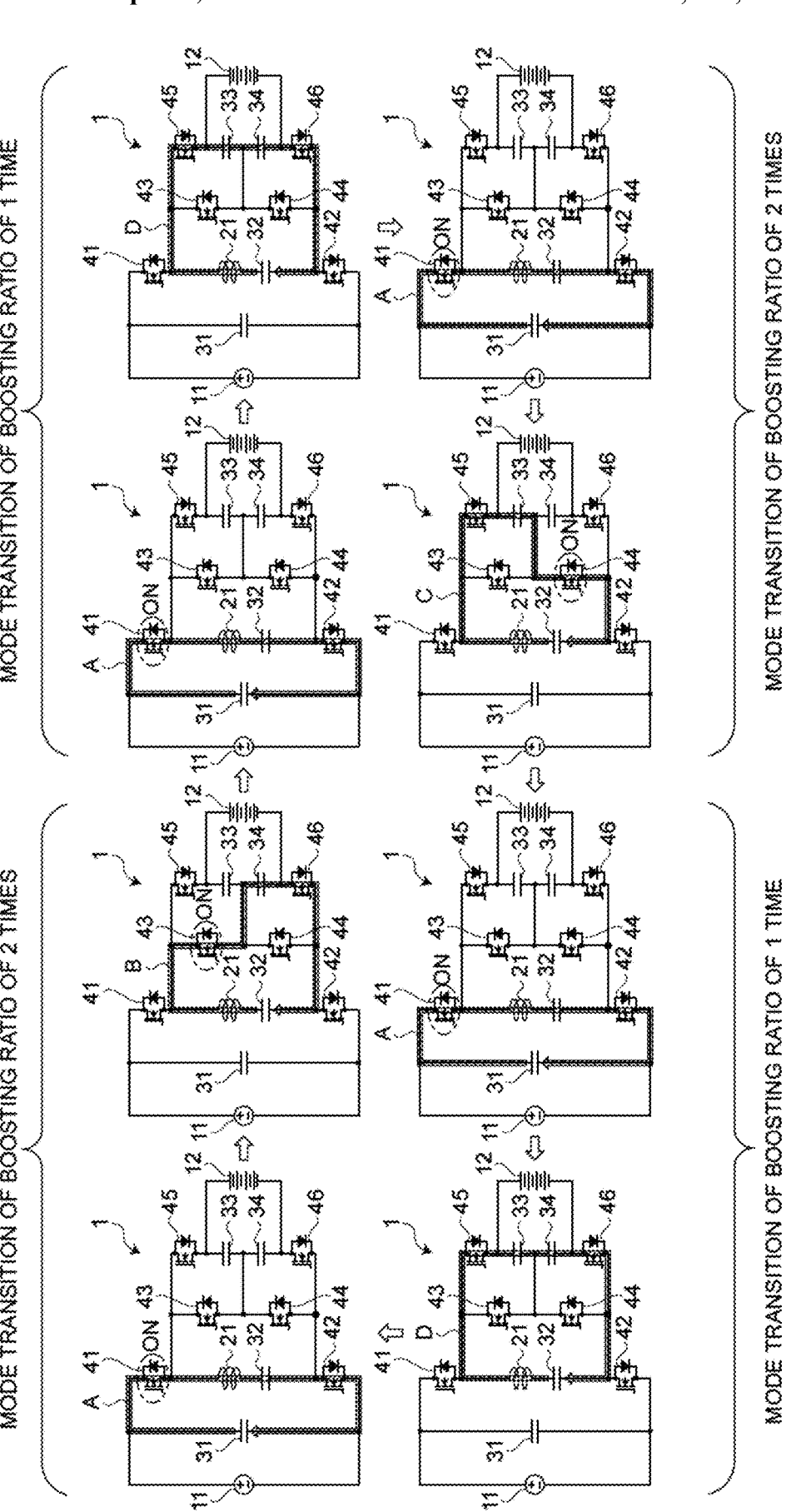
FIG. 7 is a diagram for explaining an implementation method of a boosting ratio of 1.5 times in the charge pump circuit according to the embodiment.

An implementation method of boosting ratio of 1.5 times (boosting ratio 1.5 times mode) using the charge pump circuit according to the embodiment will be described with reference to FIG. 7. The control unit 60 performs the boosting ratio 1.5 times mode by performing the boosting ratio 1 time mode and the boosting ratio 2 times mode in a predetermined order. For example, as illustrated in FIG. 7, the control unit 60 performs the boosting ratio 1.5 times mode by performing the modes A, B, A, D, A, C, A, and D in a predetermined order. Here, the mode A, the mode B, the mode A, the mode D, the mode A, the mode C, the mode A, and the mode D . . . are performed in this order. Hereinafter, details of each mode will be described clockwise from mode A in the upper left of FIG. 7.

(1) In the mode A, the first FET 41 of each switching element is turned on, and the charge charged from the charging stand 11 to the first capacitor 31 is transferred to the second capacitor 32. For example, when the voltage (stand voltage) of the charging stand 11 is 400 V, the charging stand 11 and the first capacitor 31 are always connected, and therefore the first capacitor 31 is also charged at 400 V. Then, by turning on the first FET 41 from this state, the current path of the mode A is energized, and the charge moves from the first capacitor 31 to the second capacitor 32.

(2) In the mode B, the first FET 41 is turned off and the third FET 43 is turned on, and the charge charged to the second capacitor 32 is transferred to the fourth capacitor 34. In this mode B, the first FET 41 turned on in the previous mode A is turned off, and further the third FET 43 is turned on, so that the current path of the mode B is energized, and the charge moves from the second capacitor 32 to the fourth capacitor 34. Thus, for example, by bucket-relaying the current of 400 V supplied from the charging stand 11, the fourth capacitor 34 is charged at 400 V.

(3) In the mode A, the first FET 41 is turned on and the third FET 43 is turned off, and the charge charged from the charging stand 11 to the first capacitor 31 is transferred to the second capacitor 32.

(4) In the mode D, the first FET 41 is turned off, and the charge charged to the second capacitor 32 is transferred to the third capacitor 33 and the fourth capacitor 34. In this mode D, by turning off the first FET 41 that has been turned on in the previous mode A, the current path in the mode D is energized, and the charge moves from the second capacitor 32 to the third capacitor 33 and the fourth capacitor 34.

(5) In the mode A, the first FET 41 is turned on, and the charge charged from the charging stand 11 to the first capacitor 31 is transferred to the second capacitor 32.

(6) In the mode C, the first FET 41 is turned off and the fourth FET 44 is turned on, and the charge charged to the second capacitor 32 is transferred to the third capacitor 33. In this mode C, the first FET 41 turned on in the previous mode A is turned off, and further the fourth FET 44 is turned on, so that the current path of the mode C is energized, and the charge moves from the second capacitor 32 to the third capacitor 33.

(7) In the mode A, the first FET 41 is turned on and the fourth FET 44 is turned off, and the charge charged from the charging stand 11 to the first capacitor 31 is transferred to the second capacitor 32.

(8) In the mode D, the first FET 41 is turned off, and the charge charged to the second capacitor 32 is transferred to the third capacitor 33 and the fourth capacitor 34.

As described above, in the boosting ratio 1.5 times mode, the switching by the first FET 41, the third FET 43, and the fourth FET 44 is performed, and the boosting ratio of 1.5 times is implemented while the operation of the charge pump is performed. That is, in the boosting ratio 1.5 times mode, as illustrated in FIG. 7, by alternately performing the mode transition of the boosting ratio of 2 times and the mode transition of the boosting ratio of 1 time, an intermediate voltage of the boosting ratio of 2 times and the boosting ratio of 1 time is obtained, and the boosting ratio of 1.5 times is implemented.

Here, in FIG. 7, the mode is alternately switched in the order of the boosting ratio of 2 times, 1 time, 2 times, 1 time . . . , but by alternately switching in this way, there is an aspect that the voltage fluctuation at the time of switching is reduced. On the other hand, the switching between the boosting ratio of 1 time and the boosting ratio of 2 times may not be alternate, and for example, even if the switching is performed in the order of the boosting ratio of 1 time, 1 time, 2 times, 2 times . . . , or in the order of the boosting ratio of 2 times, 2 times, 1 time, 1 time . . . , the boosting ratio of 1.5 times can be implemented. That is, it is sufficient that the boosting ratio becomes 1.5 times on average, and the switching order of the pressure ratio of 1 time and the boosting ratio of 2 times is not particularly limited.

Also in the boosting ratio 1.5 times mode, the control unit 60 switches each mode when the current (C2 current) of the second capacitor 32 is 0 in the cycle according to the resonance frequency of the LC resonator including the reactor 21 and the second capacitor 32. As described above, by performing the soft switching (0 current/0 volt switch) by the first FET 41, the third FET 43, and the fourth FET 44 at the timing when the power of the second capacitor 32 (C2) becomes 0, it is possible to perform the boosting while suppressing the switching loss to the minimum.

Implementation Method of Boosting Ratio of 1 to 1.5 Times

Figure 8:
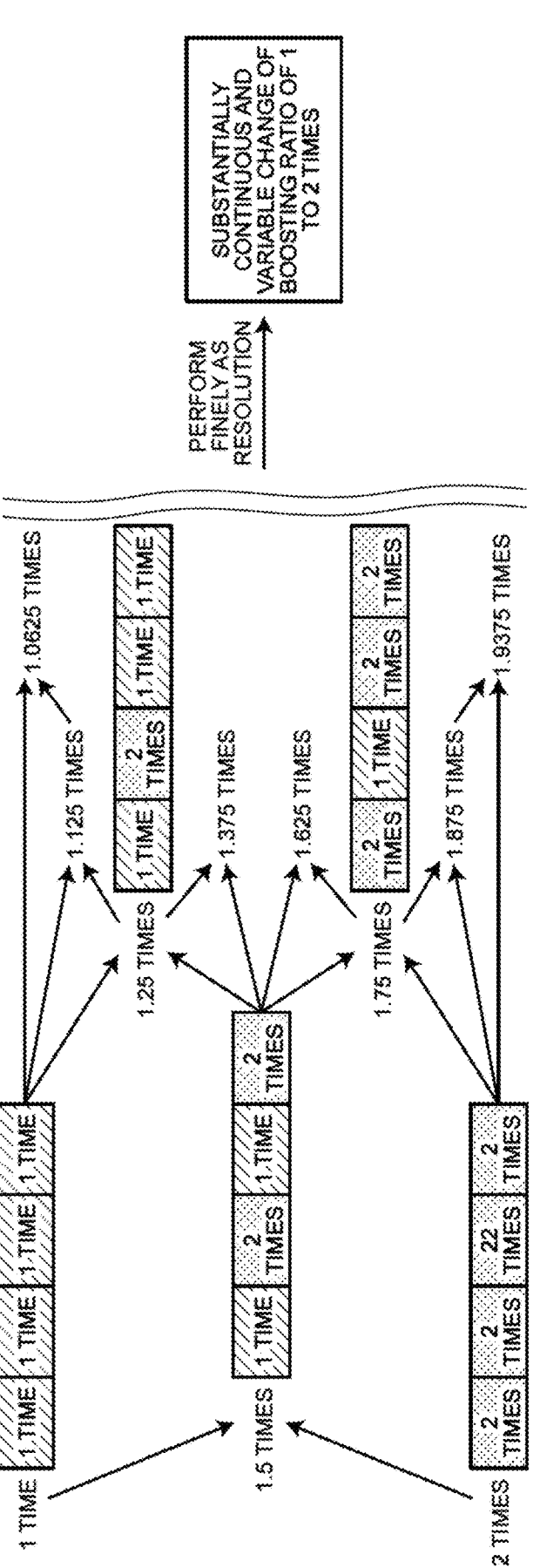
FIG. 8 is a diagram for explaining an implementation method of a boosting ratio of 1 to 1.5 times and a boosting ratio of 1.5 to 2 times in the charge pump circuit according to the embodiment.

As illustrated in FIG. 8, the control unit 60 can perform the boosting ratio 1.25 times mode by performing the boosting ratio 1 time mode and the boosting ratio 1.5 times mode in a predetermined order. In addition, the control unit 60 can perform the boosting ratio 1.125 times mode by performing the boosting ratio 1.25 times mode and the boosting ratio 1 time mode in a predetermined order. In addition, the control unit 60 can continuously change the boosting ratio between 1 to 1.5 times by further integrating (merging) the boosting ratio 1 time mode or the boosting ratio 2 times mode with respect to the above boosting ratio modes.

Implementation Method of Boosting Ratio of 1.5 to 2 Times

As illustrated in FIG. 8, the control unit 60 can perform the boosting ratio 1.75 times mode by performing the boosting ratio 1.5 times mode and the boosting ratio 2 times mode in a predetermined order. In addition, the control unit 60 can perform the boosting ratio 1.875 times mode by performing the boosting ratio 1.75 times mode and the boosting ratio 2 times mode in a predetermined order. In addition, the control unit 60 can continuously change the boosting ratio between 1.5 to 2 times by further integrating (merging) the boosting ratio 1 time mode or the boosting ratio 2 times mode with respect to the above boosting ratio modes.

Implementation Method of Step-Down Ratio of 0.5 Times

Figure 9:
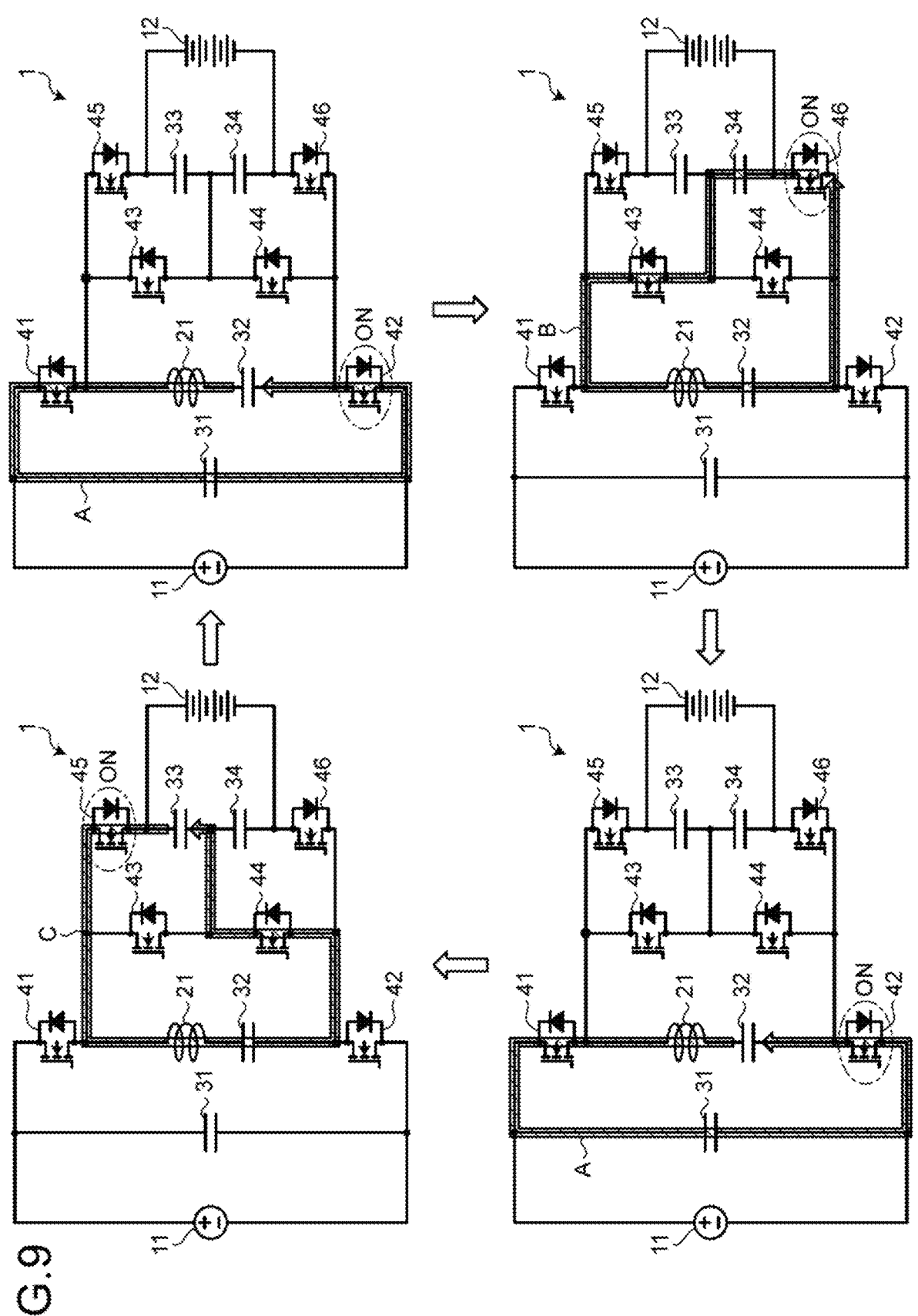
FIG. 9 is a diagram for explaining an implementation method of a boosting ratio of 0.5 times in the charge pump circuit according to the embodiment.

An implementation method of a step-down ratio of 0.5 times (step-down ratio 0.5 times mode) using the charge pump circuit according to the embodiment will be described with reference to FIG. 9. In the above description, in the charge pump circuit 1, the current from the charging stand 11 is boosted and supplied to the battery 12, but conversely, the current from the battery 12 can be also stepped down and supplied to the charging stand 11.

In this case, the control unit 60 performs a control reverse to the above-described boosting ratio 2 times mode. That is, for example, as illustrated in FIG. 9, the control unit 60 performs the step-down ratio 0.5 times mode by performing the modes C, A, B, and A in which the direction of the current is opposite (reverse) to the case of the boosting ratio 2 times mode in a predetermined order. Here, the mode C, the mode A, the mode B, and the mode A . . . are performed in this order. Hereinafter, details of each mode will be described clockwise from the mode C in the upper left of FIG. 9.

(1) In the mode C, the fifth FET 45 of each switching element is turned on, and the charge charged to the third capacitor 33 is transferred to the second capacitor 32. For example, when the voltage (battery voltage) of the battery 12 is 400 V, since the battery 12 is always connected to the third capacitor 33 and the fourth capacitor 34, the third capacitor 33 and the fourth capacitor 34 are also charged at 400 V in total (each at 200 V). Then, by turning on the fifth FET 45 from this state, the current path of the mode C is energized, and the charge moves from the third capacitor 33 to the second capacitor 32. In this way, for example, by bucket-relaying a current of half of 400 V supplied from the battery 12, the second capacitor 32 is charged at 200 V.

(2) In the mode A, the first FET 41 is turned off and the second FET 42 is turned on, and the charge charged to the second capacitor 32 is transferred to the first capacitor 31. In this mode A, the fifth FET 45 turned on in the previous mode C is turned off, and further the second FET 42 is turned on, so that the current path of the mode A is energized, and the charge moves from the second capacitor 32 to the first capacitor 31.

(3) In the mode B, the second FET 42 is turned off and the sixth FET 46 is turned on, and the charge charged to the fourth capacitor 34 is transferred to the second capacitor 32. In this mode B, the first FET 41 turned on in the previous mode A is turned off, and further the sixth FET 46 is turned on, so that the current path of the mode B is energized, and the charge moves from the fourth capacitor 34 to the second capacitor 32.

(4) In the mode A, the second FET 42 is turned on and the sixth FET 46 is turned off, and the charge charged to the second capacitor 32 is transferred to the first capacitor 31.

As described above, in the step-down ratio 0.5 times mode, the switching by the second FET 42, the fifth FET 45, and the sixth FET 46 is performed, and the step-down ratio of 0.5 times is implemented while the operation of the charge pump is performed. That is, in the step-down ratio 0.5 times mode, for example, by bucket-relaying the current of 400 V supplied from the battery 12, the first capacitor 31 is charged at 200 V. Since the first capacitor 31 and the charging stand 11 are always connected, the charging stand 11 is also charged at 200 V.

Even in the step-down ratio 0.5 times mode, the control unit 60 switches each mode when the current (C2 current) of the second capacitor 32 is 0 in the cycle according to the resonance frequency of the LC resonator including the reactor 21 and the second capacitor 32. As described above, by performing the soft switching (0 current/0 volt switch) by the second FET 42, the fifth FET 45, and the sixth FET 46 at the timing when the power of the second capacitor 32 (C2) becomes 0, it is possible to perform the step-down while suppressing the switching loss to the minimum.

As a method of implementing the step-down ratio of 0.5 to 1 time by the charge pump circuit 1, the above-described method of implementing the boosting ratio of 1 to 1.5 times and the boosting ratio of 1.5 to 2 times (see FIG. 8) may be applied.

Charging Dedicated Circuit

Figure 10:
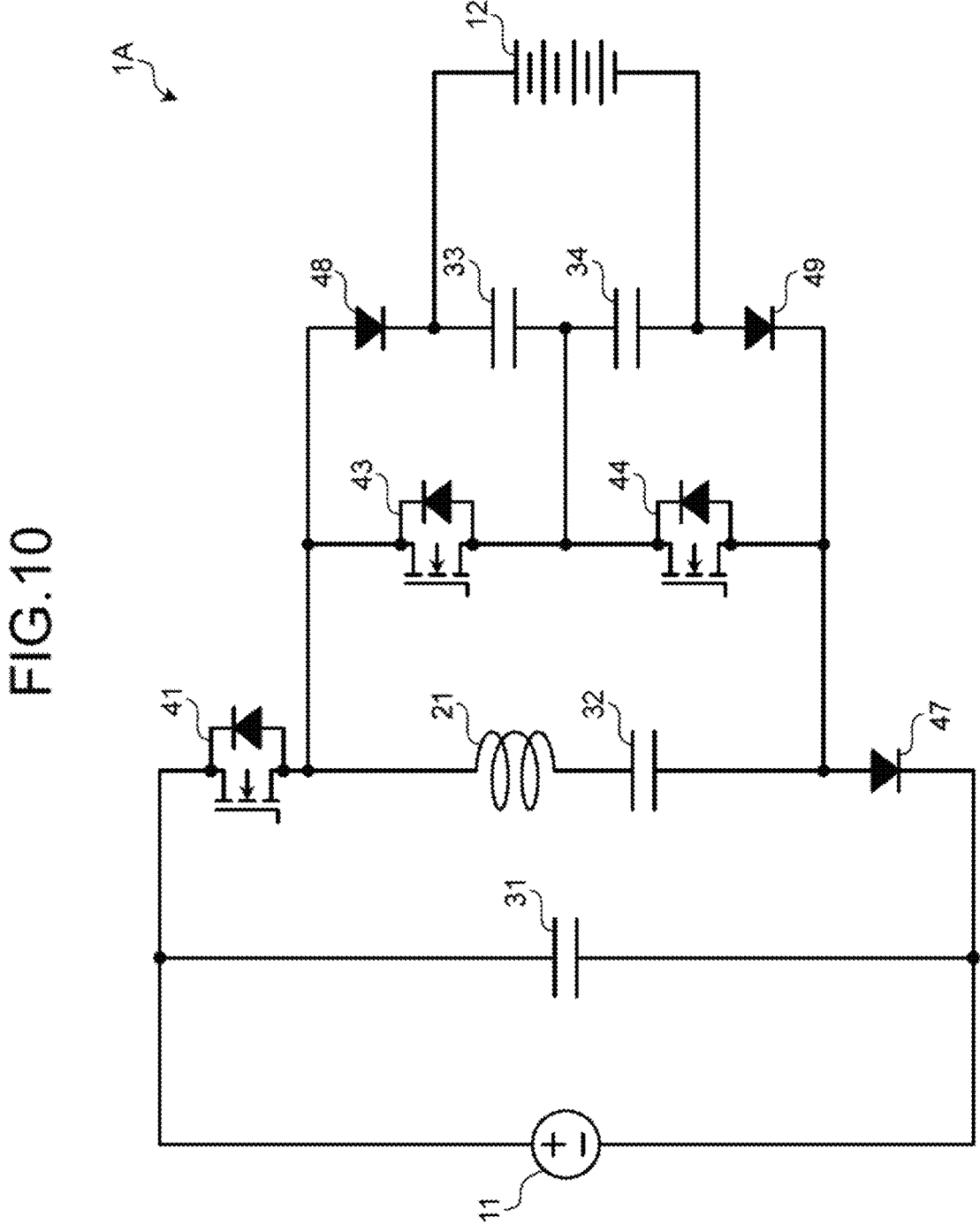
FIG. 10 is a diagram illustrating an example of a circuit configuration in a case where the charge pump circuit according to the embodiment is configured as a charging dedicated circuit.

An example of a case where the charge pump circuit according to the embodiment is configured as a charging dedicated circuit will be described with reference to FIG. 10. In a case where the charge pump circuit according to the embodiment is configured as a charging dedicated circuit, for example, as in a charge pump circuit 1A in FIG. 10, a MOSFET disposed in a forward direction with respect to a charging stand is replaced with a diode. That is, in the charge pump circuit 1A, the second FET 42, the fifth FET 45, and the sixth FET 46 of the charge pump circuit 1 are replaced with the diodes 47, 48, and 49, respectively.

As described above, in the charge pump circuit 1A, MOSFETs (the second FET 42, the fifth FET 45, and the sixth FET 46) that do not perform switching at the time of charging from the charging stand 11 to the battery 12 are changed to inexpensive diodes 47, 48, and 49. Accordingly, the manufacturing cost can be reduced.

Power Supply Dedicated Circuit

Figure 11:
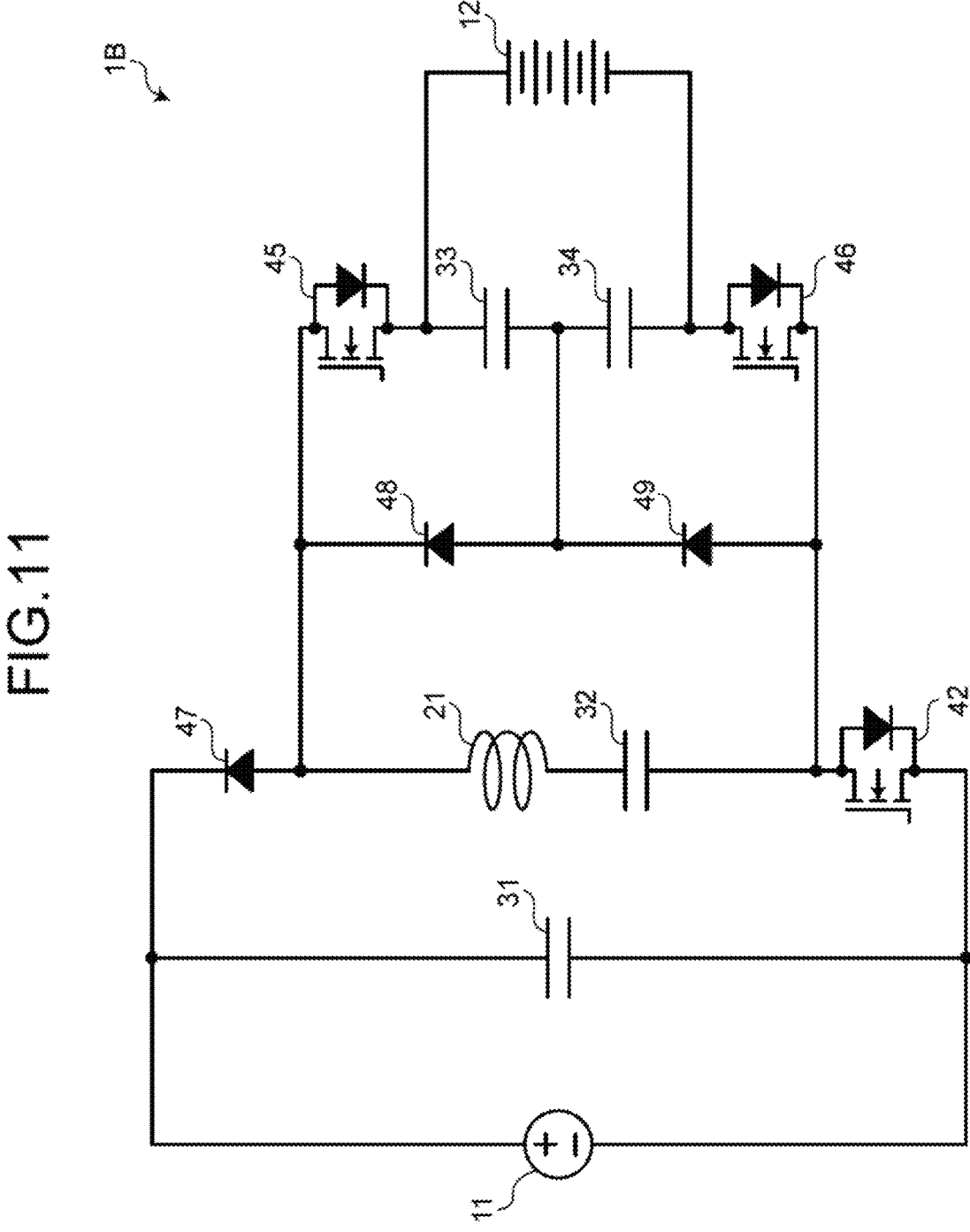
FIG. 11 is a diagram illustrating an example of a circuit configuration in a case where the charge pump circuit according to the embodiment is configured as a power supply dedicated circuit.

An example of a case where the charge pump circuit according to the embodiment is configured as a power supply dedicated circuit will be described with reference to FIG. 11. In a case where the charge pump circuit according to the embodiment is configured as a power supply dedicated circuit, for example, as in a charge pump circuit 1B in FIG. 11, a MOSFET disposed in the reverse direction with respect to the charging stand 11 is replaced with a diode. That is, in the charge pump circuit 1B, the first FET 41, the third FET 43, and the fourth FET 44 of the charge pump circuit 1 are replaced with the diodes 47, 48, and 49, respectively.

As described above, in the charge pump circuit 1B, the MOSFETs (the first FET 41, the third FET 43, and the fourth FET 44) that do not perform switching at the time of charging from the battery 12 to the charging stand 11 are changed to the inexpensive diodes 47, 48, and 49. Accordingly, the manufacturing cost can be reduced.

Other Modifications

Figure 12:
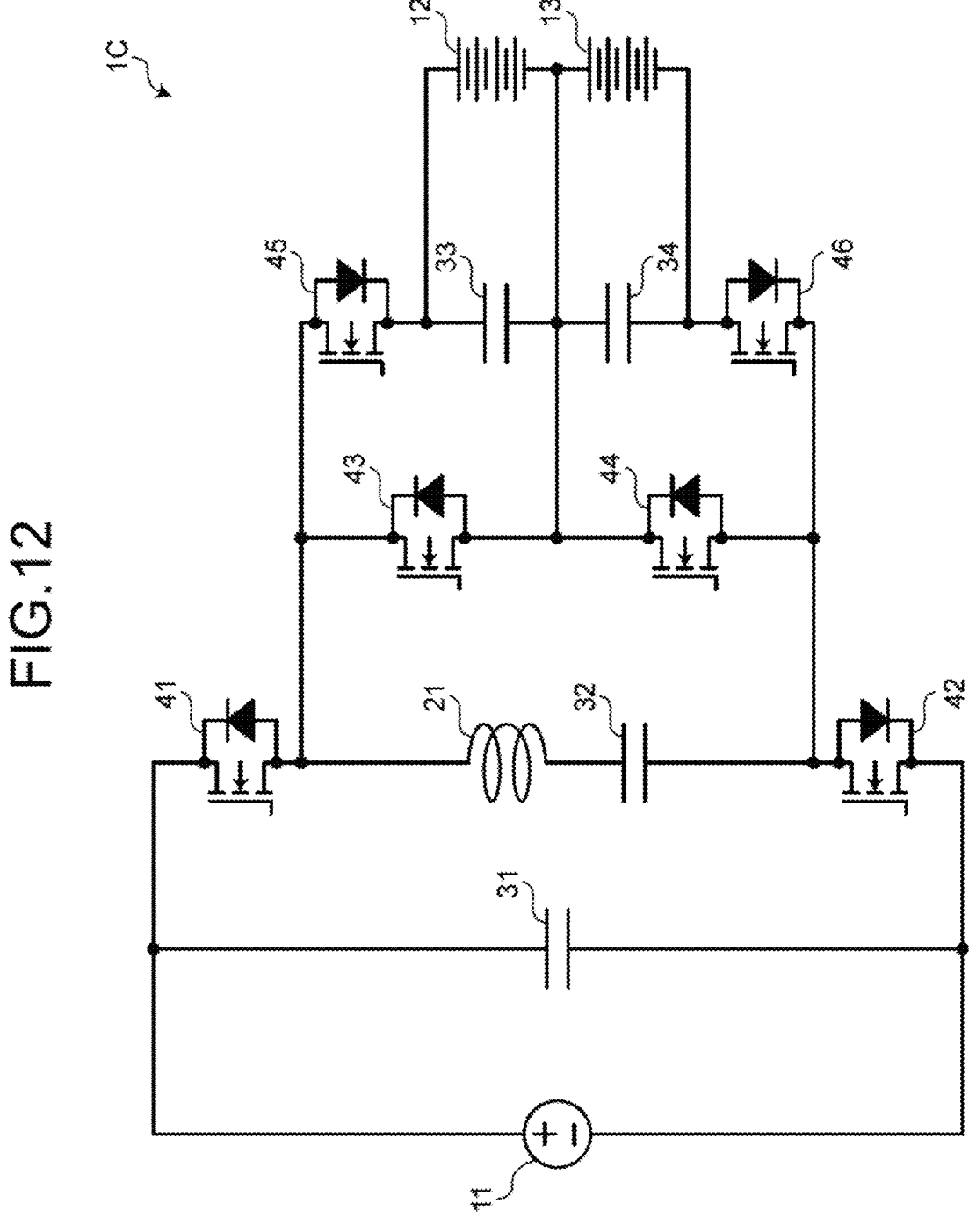
FIG. 12 is a diagram illustrating an example of a circuit configuration in a case where two batteries are provided in the charge pump circuit according to the embodiment.

In the above description, the charge pump circuit 1, 1A, 1B including only one battery 12 has been described, but the number of batteries 12 is not particularly limited. For example, a charge pump circuit 1C illustrated in FIG. 12 includes a battery 13 in addition to the battery 12.

The battery 12 and the battery 13 are connected in series to each other. A midpoint between the battery 12 and the battery 13 is connected to a midpoint between the third capacitor 33 and the fourth capacitor 34. As described above, also in the charge pump circuit 1C including the plurality of batteries 12 and 13, the control unit 60 performs arbitrary boosting between the boosting ratios of 1 to 1.5 times by performing the boosting ratio 1.5 times mode and the boosting ratio 1 time mode in a predetermined order. In addition, the control unit 60 performs arbitrary boosting between the boosting ratios of 1.5 to 2 times by performing the boosting ratio 1.5 times mode and the boosting ratio 2 times mode in a predetermined order.

Here, in the related-art charge pump circuit, for example, it has been possible to select a boosting ratio of 1 time, 2 times, or the like, but it has been difficult to continuously change the boosting ratio. On the other hand, in the charge pump circuit according to the embodiment, the boosting ratio 1.5 times mode and the boosting ratio 1 time mode are performed in a predetermined order, or the boosting ratio 1.5 times mode and the boosting ratio 2 times mode are performed in a predetermined order. As a result, in the charge pump type boosting/step-down circuit, the boosting ratio (or step-down ratio) can be changed continuously and with low loss.

According to the present disclosure, the boost ratio can be changed continuously and with low loss.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge pump circuit comprising:
a charging stand;
a battery connected in series with the charging stand;
a first capacitor connected in parallel with the charging stand;

a reactor and a second capacitor connected in series with each other and connected in parallel with the charging stand;
a first FET, a second FET, a fifth FET, and a sixth FET connected to the charging stand;
a third FET and a fourth FET connected in series with each other and connected in parallel with the charging stand;
a third capacitor and a fourth capacitor connected in series with each other and connected in parallel with the charging stand; and
a control unit, wherein
the control unit
performs a boosting ratio 1.5 times mode by performing a boosting ratio 1 time mode and a boosting ratio 2 times mode in a predetermined order; and
performs arbitrary boosting between boosting ratios of 1 to 2 times by performing the boosting ratio 1.5 times mode and the boosting ratio 1 time mode in a predetermined order, or performing the boosting ratio 1.5 times mode and the boosting ratio 2 times mode in a predetermined order.

2. The charge pump circuit according to claim 1, wherein
the first FET is connected in series in a reverse direction with respect to the charging stand, and
the second FET, the fifth FET, and the sixth FET are connected in series in a forward direction with respect to the charging stand.

3. The charge pump circuit according to claim 1, wherein the control unit turns on the first FET, and causes a direct current from the charging stand to flow through the first FET, the fifth FET, the battery, the sixth FET, and the second FET to perform the boosting ratio 1 time mode.

4. The charge pump circuit according to claim 3, wherein the control unit switches each mode when a current of the second capacitor is 0 in a cycle according to a resonance frequency of an LC resonator including the reactor and the second capacitor.

5. The charge pump circuit according to claim 1, wherein
the control unit performs the boosting ratio 1 time mode by performing, in a predetermined order,
a mode A in which the first FET is turned on and a charge charged from the charging stand to the first capacitor is transferred to the second capacitor; and
a mode D in which the first FET is turned off and the charge charged to the second capacitor is transferred to the third capacitor and the fourth capacitor.

6. The charge pump circuit according to claim 5, wherein the control unit switches each mode when a current of the second capacitor is 0 in a cycle according to a resonance frequency of an LC resonator including the reactor and the second capacitor.

7. The charge pump circuit according to claim 1, wherein
the control unit performs the boosting ratio 2 times mode by performing, in a predetermined order,
a mode A in which the first FET is turned on and a charge charged from the charging stand to the first capacitor is transferred to the second capacitor;
a mode B in which the first FET is turned off and the third FET is turned on, and a charge charged to the second capacitor is transferred to the fourth capacitor;
a mode A in which the first FET is turned on and the third FET is turned off, and a charge charged from the charging stand to the first capacitor is transferred to the second capacitor; and a mode C in which the first FET is turned off and the fourth FET is turned on, and a charge charged to the second capacitor is transferred to the third capacitor.

8. The charge pump circuit according to claim 7, wherein the control unit switches each mode when a current of the second capacitor is 0 in a cycle according to a resonance frequency of an LC resonator including the reactor and the second capacitor.

9. The charge pump circuit according to claim 1, wherein the control unit performs the boosting ratio 1.5 times mode by performing, in a predetermined order, a mode A in which the first FET is turned on and a charge charged from the charging stand to the first capacitor is transferred to the second capacitor;

a mode B in which the first FET is turned off and the third FET is turned on, and the charge charged to the second capacitor is transferred to the fourth capacitor;

a mode A in which the first FET is turned on and the third FET is turned off, and a charge charged from the charging stand to the first capacitor is transferred to the second capacitor;

a mode D in which the first FET is turned off and a charge charged to the second capacitor is transferred to the third capacitor and the fourth capacitor;

a mode A in which the first FET is turned on and a charge charged from the charging stand to the first capacitor is transferred to the second capacitor;

a mode C in which the first FET is turned off and the fourth FET is turned on, and a charge charged to the second capacitor is transferred to the third capacitor;

a mode A in which the first FET is turned on and the fourth FET is turned off, and a charge charged from the charging stand to the first capacitor is transferred to the second capacitor; and a mode D in which the first FET is turned off and a charge charged to the second capacitor is transferred to the third capacitor and the fourth capacitor.

10. The charge pump circuit according to claim 9, wherein the control unit switches each mode when a current of the second capacitor is 0 in a cycle according to a resonance frequency of an LC resonator including the reactor and the second capacitor.

11. The charge pump circuit according to claim 1, wherein the control unit performs arbitrary boosting between the boosting ratios of 1 to 1.5 by performing the boosting ratio 1.5 times mode and the boosting ratio 1 time mode in a predetermined order.

12. The charge pump circuit according to claim 11, wherein the control unit switches each mode when a current of the second capacitor is 0 in a cycle according to a resonance frequency of an LC resonator including the reactor and the second capacitor.

13. The charge pump circuit according to claim 1, wherein the control unit performs arbitrary boosting between the boosting ratios of 1.5 to 2 times by performing the boosting ratio 1.5 times mode and the boosting ratio 2 times mode in a predetermined order.

14. The charge pump circuit according to claim 13, wherein the control unit switches each mode when a current of the second capacitor is 0 in a cycle according to a resonance frequency of an LC resonator including the reactor and the second capacitor.

* * * * *